United States Patent
Lefaure

(10) Patent No.: US 7,250,851 B2
(45) Date of Patent: Jul. 31, 2007

(54) METHOD FOR LOCATING SENSORS MOUNTED EACH ON A VEHICLE WHEEL

(75) Inventor: Philippe Lefaure, Montbrun (FR)

(73) Assignee: Siemens VDO Automotive, Toulouse Cedex (FR)

( * ) Notice: Subject to any disclaimer, the term of this patent is extended or adjusted under 35 U.S.C. 154(b) by 175 days.

(21) Appl. No.: 10/481,610

(22) PCT Filed: Jun. 11, 2002

(86) PCT No.: PCT/EP02/06377

§ 371 (c)(1),
(2), (4) Date: Aug. 13, 2004

(87) PCT Pub. No.: WO03/003043

PCT Pub. Date: Jan. 9, 2003

(65) Prior Publication Data

US 2005/0078001 A1    Apr. 14, 2005

(30) Foreign Application Priority Data

Jun. 28, 2001  (FR) .................................. 01 08551

(51) Int. Cl.
   *B60C 23/00* (2006.01)
(52) U.S. Cl. ................ 340/445; 340/446; 340/426.18; 340/449; 73/146.2; 73/146.8
(58) Field of Classification Search ................ 340/445, 340/442, 446, 447, 448–449, 426.18, 444, 340/454; 73/146.2, 146.3, 146.4, 146.5, 73/146.8

See application file for complete search history.

(56) References Cited

U.S. PATENT DOCUMENTS

| 5,670,716 | A  | * | 9/1997  | Tamasho et al. ........... 73/146.2 |
| 5,825,286 | A  |   | 10/1998 | Coulthard |
| 6,018,993 | A  | * | 2/2000  | Normann et al. .......... 73/146.5 |
| 6,112,585 | A  | * | 9/2000  | Schrottle et al. .............. 73/146 |
| 6,362,731 | B1 | * | 3/2002  | Lill ............................ 340/445 |
| 6,385,511 | B1 |   | 5/2002  | Fondeur et al. |
| 6,501,372 | B2 | * | 12/2002 | Lin ............................ 340/442 |
| 2003/0001735 | A1 | | 1/2003  | Honeck et al. |
| 2004/0150516 | A1 | | 8/2004  | Faetanini |

FOREIGN PATENT DOCUMENTS

| EP | 0 931 679 | 7/1999 |
| EP | 1 004 461 | 5/2000 |
| EP | 1004 461 A2 * | 5/2000 |
| EP | 1004461 A2 * | 5/2000 |
| FR | 2 774 178 | 7/1999 |
| WO | WO 00 34062 | 6/2000 |

* cited by examiner

*Primary Examiner*—Benjamin C. Lee
*Assistant Examiner*—Daniel Previl
(74) *Attorney, Agent, or Firm*—Young & Thompson

(57) ABSTRACT

Each sensor is provided with an emitter and the vehicle is provided with a corresponding receiver adapted to receive signals emitted by each sensor. The receiver is provided with at least one antenna disposed such that it is not located substantially equidistantly from the sensors, the antennas being located on a same side of the vehicle. The location of the sensors is carried out by analyzing the power of the field received by the receiver of each antenna for each sensor, the field power received by one antenna being the greater, the nearer to the antenna is the sensor that emitted the corresponding signal.

9 Claims, 1 Drawing Sheet

METHOD FOR LOCATING SENSORS MOUNTED EACH ON A VEHICLE WHEEL

BACKGROUND OF THE INVENTION

The present invention relates to a process for locating a sensor associated with a vehicle wheel. This process permits for example determining the position (front, rear, right, left, . . . ) of a pressure sensor mounted in an automotive vehicle tire.

DESCRIPTION OF THE RELATED ART

In a vehicle provided with a system for surveillance of the pressure of the tires, it is necessary to be able automatically to identify the location of a pressure sensor. Thus, when information concerning the pressure of a tire is sent to a central unit, the latter must know to which tire the received pressure information corresponds.

Information concerning tire pressure, in a tire pressure surveillance system, is sent from sensors located at the wheels toward the central unit by radio waves. An antenna fixed relative to the chassis of the vehicle receives the information and transmits it. Certain pressure surveillance systems for tires provide one antenna per wheel and hence per pressure sensor. In this case, the identification of the wheel takes place by filtering. For a given antenna, the most powerful signal received corresponds to the pressure sensor nearest the antenna. The location of the wheel and of the associated sensor thus takes place in this way.

However, to simplify the systems and to render it more economical, it is preferable to have but a single receiver. When a pressure sensor thus emits information, it must be possible to determine with which wheel this sensor is associated. For an automotive vehicle comprising four wheels, it is necessary to determine whether the sensor is associated with a front wheel or a rear wheel and also whether the information comes from a wheel located on the right or on the left of the vehicle.

The document FR 2 774 178 discloses a process for locating and recognizing the position of the wheels on a vehicle. In this case, the wheels are provided each with a sensor emitting a detection signal representative of a condition of the corresponding wheel. The vehicle is itself provided with a device for processing the detection signal. The process described in this document consists in predetermining a signature of a detection signal emitted by a sensor carried by a wheel, and memorizing this signature and the corresponding position of the wheel in the processing device. The recognition of the position of a wheel is obtained by analyzing the signature of a detection signal and by comparing this signature to the memorized signatures.

SUMMARY OF THE INVENTION

The present invention thus has for its object to provide a new process for automatic location which permits indicating to which wheel corresponds a signal received with a single receiver. This process can preferably be practiced with means that are not very expensive.

To this end, it provides a process for locating sensors each mounted on a vehicle wheel, each sensor being provided with an emitter and the vehicle being provided with a corresponding receiver adapted to receive the signals emitted by each sensor.

According to the invention, the receiver is provided with an antenna, disposed such that it is not substantially equidistant from any two sensors, and the location of the sensors is carried out by analyzing the power of the field received by the receiver by means of the antenna for each sensor, the field power received by the antenna being the greater the nearer to the antenna is the sensor that emitted the signal.

This location process is based on the physical principle known as attenuation of an electromagnetic field as a function of distance. This attenuation is proportional to the inverse of the square of the distance. The process according to the invention uses this physical principle. Thus, for a given antenna, the more powerful signal received corresponds to the emitter, in this case associated each time with a sensor, that is nearest, and the reception power decreases as a function of the distance between the emitter and the receiver.

It is not necessary to know exactly the power of the received signal. It suffices to know the power relative to signals corresponding to the different sensors. It is possible to estimate this power of the electronic measurement with the help for example of a device for indicating power of the RSSI type (Receiver Signal Strength Indicator). A modification of this measurement could consist in causing the sensitivity of the receiver to vary. To the extent that this sensitivity decreases, the number of signals received also decreases. One can thus deduce the relative distance of the sensors, the more remote sensors being those from which are no longer detected the initial signals.

To increase the reliability of the results obtained by this process, the invention also proposes a process using at least two antennas. It is a matter of locating sensors each mounted on one wheel of the vehicle, each sensor being provided with an emitter and the vehicle being provided with a corresponding receiver adapted to receive the signals emitted by each sensor. In this process, the receiver is provided with two separate antennas, separated from each other and disposed such that no antenna is substantially equidistant from the sensors, the two antennas being located on a same side of the vehicle, and the location of the sensors being established by analyzing the power of the field received by the receiver by means of each antennas for each sensor, the field power received by an antenna being the greater, the nearer the sensor emitting the corresponding signal is to the antenna.

For a vehicle comprising four wheels, this process according to the invention comprises for example the following steps:

a) analysis of the power of the signals received by the two antennas so as to distinguish the two sensors located on the side of the antennas from two other sensors, the signal received from these two sensors being the less attenuated, b) one antenna being inactivated and the other being activated, analysis of the power of the signals received from the two sensors which are located on the same side as the antenna so as to determine which sensor is nearer the antenna that is still activated, and c) one antenna being inactivated and the other activated, analysis of the power of the signals received from the two sensors that are located on the side opposite the antennas so as to determine which sensor is the nearer the antenna that is still activated.

It is necessary to break down the location process into several successive steps, permitting increasing the reliability of the obtained results.

Step a) of the above process is for example carried out as follows:

adjustment of the receiver to a predetermined sensitivity to receive all the signals emitted by the four sensors with the two antennas, and adjustment of the receiver to a lesser sensitivity such that, for the two antennas, the signals emitted by the sensors located on the same side as the antennas will be received whilst the signals emitted by the other sensors will not be received.

In this location process, in step b) and/or step c), the power analysis is for example carried out by adjusting the sensitivity of the receiver such that the power of the signal received by the sensor to be identified and located near the inactive antenna, will be weak whilst the power of the signal received by the sensor to be identified and located near the active antenna will be substantially stronger. The sensitivity of the receiver can thus be decreased until a single signal is received.

This signal thus corresponds to the signal emitted by the nearest sensor. It is thus possible to determine the position of the two sensors whose signals are analyzed.

In the case of step b), the sensors to be identified are the sensors located on the side of the antennas whilst in the case of step c), the sensors to be identified are the sensors located on the opposite side from the antennas.

In another embodiment of the process, in step b) and/or in step c), the power analysis is for example carried out by decreasing the sensitivity of the receiver until but a single signal emitted by the sensors to be identified will still be received by the receiver, and a deduction of the position of the two sensors to be identified is thus achieved.

In step c), the signals from all the sensors are of course received, including those located on the side of the antennas. However, these signals are already modified as being from the side of the antennas from step a) and we are thus interested only in signals received by the other sensors, which is to say those disposed on the side opposite to the antennas.

To increase the reliability of the location process described above, step b) and/or c) is preferably carried out twice in succession, once with a first antenna active and the second antenna inactive, and the second time with the first antenna inactive and the second antenna active, and a correlation step is then provided to compare the results obtained in the course of these two analyses.

Similarly, again to increase the reliability of the process, step c) is carried out several times in a repetitive manner and a statistical analysis of the results is made. This can be generalized for all the process (with one or several antennas) which is thus preferably carried out in a repetitive manner and a statistical analysis of the results thus obtained is made.

In a modified embodiment, the two antennas are integrated into the instrument panel of a vehicle, one antenna being located in the right portion and the other in the left portion of this instrument panel. In this way, the two antennas will be located in the front of the vehicle, one to the right and the other to the left. In this modification, one antenna can be integrated with an electronic housing integrating the receiver, whilst the other antenna is for example an antenna external to this housing.

The present invention also relates to a location device to practice a process such as described above, characterized in that it comprises a receiver, two antennas, a switch with two inlets insulated from each other and an outlet, mounted such that the receiver is connected to one or the other of the antennas, as well as a computer for controlling and managing the device.

In a modified embodiment of this device, the receiver is integrated into the computer. It can also be provided that one antenna is integrated into the computer and the other antenna is an external antenna.

The details and advantages of the invention will become better understood from the description which follows, given with reference to the accompanying schematic drawing, in which:

The single FIGURE represents schematically a vehicle seen from above, provided with an automatic device for locating sensors according to the invention.

The process according to the invention is adapted to be performed in an automotive vehicle provided with four wheels, each of these wheels being itself provided with one pressure sensor. In a manner known per se, each pressure sensor includes an RF (Radio Frequency) emitter. The vehicle is itself provided with a corresponding receiver. In this way, the measurements carried out by the pressure sensor can be transmitted to a computer which analyzes and interprets the data it receives. Conventionally, the communication between the sensors and the receiver takes place with the help of a signal of 433 MHz.

The process according to the invention, described hereafter, permits the receiver, where it receives a signal from a sensor, to know where this sensor is located and thus to determine with which wheel it must associated the information received. Thus, each sensor, when it emits a signal toward the receiver, sends a code identifying it as well as the information to be transmitted. However, because the wheels can be rotated and changed as to position (right-left exchange of the tires or front-rear exchange) the recognition of the code identifying the sensor is not sufficient to know where this sensor is located.

In a novel way, the process according to the invention proposes carrying out an automatic location of the pressure sensors mounted on the wheels of the vehicle, by using the property of attenuation of the power of the electromagnetic waves when they propagate.

BRIEF DESCRIPTION OF THE DRAWING

The system used to practice this process is shown schematically in the single FIGURE accompanying the present specification.

DESCRIPTION OF THE PREFERRED EMBODIMENTS

Figure 1:
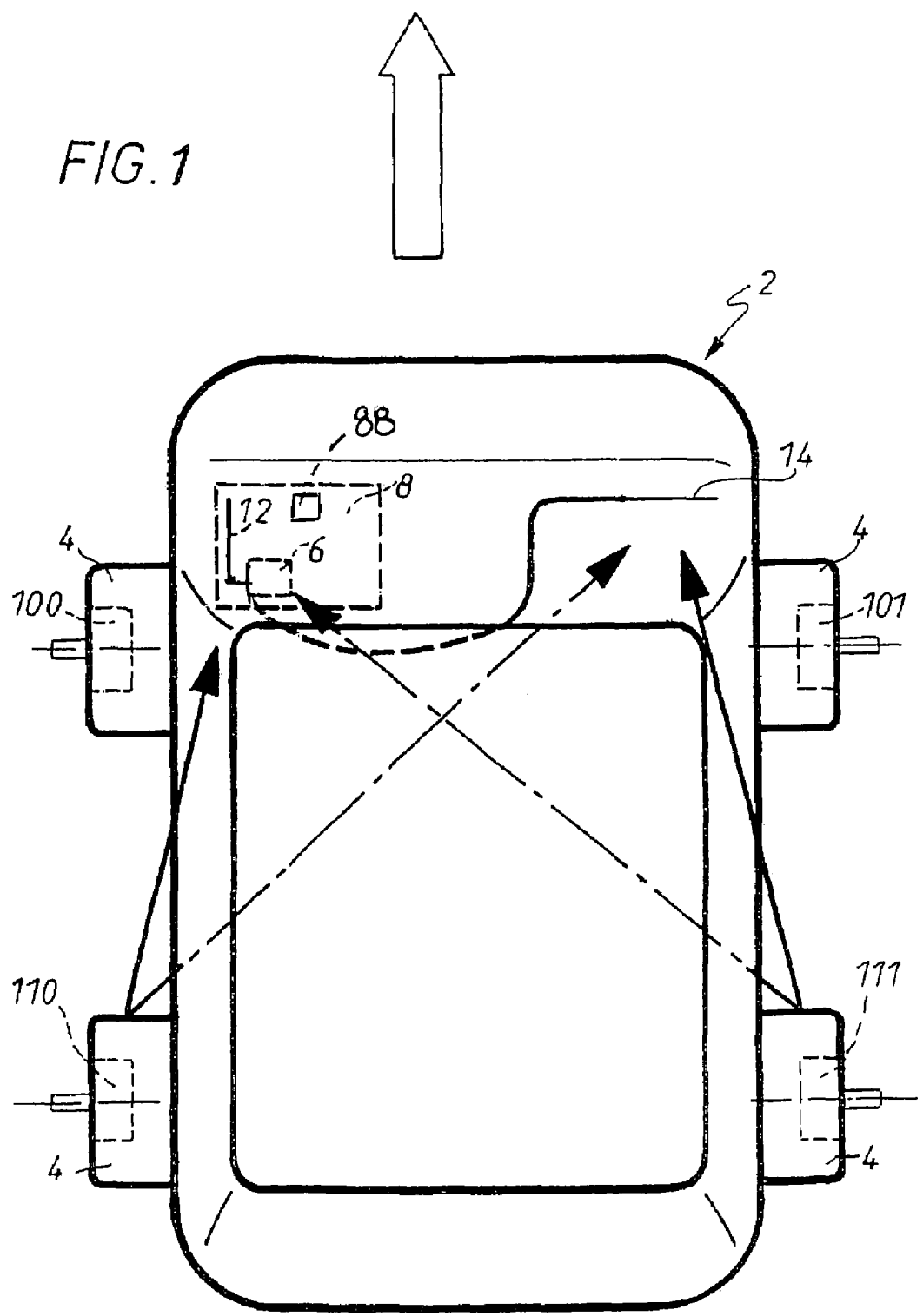

So that this system can operate, it is necessary that a vehicle 2, provided with four wheels 4 be provided, for each tire of the wheels 4, one sensor. Let it be supposed in what follows that it is here a matter of pressure sensors, but sensors could also be conceived of another type for example a temperature sensor. The vehicle 2 is thus provided with four sensors: one front left sensor indicated at 100, one front right sensor indicated at 101, one left rear sensor indicated at 110 and a right rear sensor indicated at 111. As already indicated above, each of these sensors is provided with an RF emitter.

The vehicle 2 is itself provided with a single RF receiver 6 adapted to receive signals emitted by the four sensors 100, 101, 110, 111. This receiver 6 is indicated into a controllable computer 8. The signals arriving at the receiver 6 are received by two antennas. A first antenna 12 is an antenna integrated into the computer 8. It can for example be an antenna printed on a circuit of this computer. The second antenna is an external antenna 14 for example an antenna of the quarter wave type. A switch 88 having two inputs and one output is integrated into the computer 8. It permits connecting the receiver 6 either to the internal antenna 12 or to the external antenna 14. The two inputs of this switch are insulated from each other with a minimum insulation of 30 dB. The control of the switch is ensured by the computer 8.

The receiver has a sensitivity adjustable by means of a gain control device. It also comprises an output of the RSSI type (Receiver Signal Strength Indicator). This output permits the analysis of the field level received by the emitters associated with the sensors 100, 101, 110, 111. The gain control functions and analysis of the field level received, are also managed by the computer 8 with the help of an analog/digital port for the RSSI output and a logic port for the gain control.

Let it be supposed that four sensors 100, 101, 110, 111 are all four identical. As indicated above, the emitter associated with each of the sensors, when it emits an RF signal, first emits an identifying code corresponding to each sensor. The identifying codes emitted by the sensors 100, 101, 110, 111 are recognized by the computer 8. Let it for example be supposed that the identifying codes for these sensors are respectively 100, 101, 110 and 111. The computer 8 recognizes these codes but does not know where the corresponding sensor is geographically located. All the sensors being identical, it can thus be supposed that the power emitted by each of these sensors is substantially the same order. Let it be supposed for example that there is a tolerance of this power of ±1 dB.

It will be recalled that the attenuation of the power of a transmitted electromagnetic wave is subject to a law of decrease proportional to the square of the distance from emission.

In the example shown in the drawing, the computer 8, and hence as a result the internal antenna 12, is disposed in the left portion of the instrument panel of the vehicle 2. The external antenna 14 is also disposed at the instrument panel of this vehicle but in the right portion of the latter. It is important in this case that neither of these two antennas be substantially equidistant from the four wheels 4 or from the associated sensors. In this case, the two antennas 12, 14 are disposed in the front of the vehicle. The process described hereafter would operate in a similar manner if the two antennas were located at the rear of the vehicle, on the right side or on the left side of the latter. For purposes of clarity, the description which follows will be given only with reference to the accompanying drawing, without taking account of the other possible positions of the antennas 12 and 14.

Three successive steps are proposed to permit the location of the sensors 100, 101, 110, 111. In a first step, the front and rear sensors are located. In the following step, the front right sensor is distinguished from the front left sensor, and in the third final step it is proposed to distinguish the rear right sensor from the rear left sensor. A preferred modified embodiment of the process according to the invention is described hereafter.

First of all, a power balance of the four sensors is carried out. The receiver 6 is thus adjusted to maximum sensitivity with the internal antenna 12 and then the external antenna 14. The field level received is thus analyzed and memorized. The table below gathers the results of the power balance carried out.

TABLE 1

| Identifying Sensor | Internal antenna 12 Reception (RSSI level) | External antenna 14 Reception (RSSI level) |
|---|---|---|
| 100 | A0 | B0 |
| 101 | A1 | B1 |
| 110 | A2 | B2 |
| 111 | A3 | B3 |

Ai and Bi, i=0 to 3, correspond to the power level for each signal received. This table, or at least the values it contains, is stored in the memory of the computer 8.

The gain control of the receiver 6 is then adjusted to a gain value at which the internal and external antennas 12 and 14 receive the signals emitted by the front sensors 100, 101 but do not receive the signals from the rear sensors 110, 111. The power levels of the received signals are collected in the following table.

TABLE 2

| Identifying Sensor | Internal antenna 12 Reception (RSSI level) | External antenna 14 Reception (RSSI level) |
|---|---|---|
| 100 | C0 | D0 |
| 101 | C1 | D1 |
| 110 | (C2) | (D2) |
| 111 | (C3) | (D3) |

The levels Ci, Di, i=0 to 3 correspond to the power level of the field corresponding to the signal received by the receiver. The values C2, C3, D2, D3 are given in parentheses to indicate that they correspond to a signal that is not received or at least not detected, by the receiver 6. The results gathered in this table are also memorized in the computer 8.

There are thus detected the sensors which are disposed at the front of the vehicle and those disposed at the rear of the vehicle. It is clear that the sensors disposed at the front of the vehicle are those for which a signal has been detected during measurement with reduced sensitivity.

However, the measurement results contained in the above tables show that we can locate not only the sensors mounted at the front and at the rear of the vehicle, but also can differentiate between the right sensors and the left sensors by analyzing the values Ai, Bi, Ci and Di that are measured.

By analyzing the levels of the received signals, it is thus theoretically possible to locate the sensors. Thus, for a given antenna, the signal received at the level of the higher field will correspond to the signal emitted by the sensor nearer the antenna. The measurements made with the two antennas permit correlating the obtained results. However, the obtained results are not always satisfactory because it is often difficult particularly for sensors spaced from the antennas, to distinguish the attenuated signals, which is to say coming from a relatively remote sensor, and relatively faint. There are provided, as indicated above, the three steps to carry out the location.

The first step consists in carrying out the measurements collected in the two above tables. There is thus obtained the distribution between the front sensors 100, 101 and the rear sensors 110, 111.

The second step thus consists in distinguishing the front left sensor 100 from the front right sensor 101. It will be seen that the distance between the sensor 100 mounted in the left front wheel and the internal receiving antenna 12 implanted in the computer 8, is relatively small relative to the distance between this internal antenna 12 and the sensor 101 mounted in the right front wheel. Similarly, the distance between the sensor 101 mounted in the right front wheel and the external antenna 14 is relatively small relative to the distance between this external antenna 14 and the sensor 100 mounted in the left front wheel.

To distinguish between these two sensors, for example there is first of all activated the internal antenna 12. The sensitivity of the receiver 6 is thus decreased such that the signals emitted by the sensor 101 mounted in the front right wheel will be weakly received, whilst the power of the signals received by the sensor 100 mounted in the front left wheel is substantially greater. The analysis of the power levels of the fields corresponding to the received signals permits establishing fairly easily the position of each sensor (100 and 101). A measurement carried out with a single antenna is sufficient, but it is preferable to make a correlation by using the two antennas.

Thus, in the example given in Table 2, if C0<<C1 and D1<<D0, the computer 11 deduces from this that the sensor 100 is disposed to the left front and that the sensor 100 is disposed to the right front.

We should also distinguish the right rear wheel from the left rear wheel. As for the front wheels, it is seen that the distance between the sensor 110 mounted in the left rear wheel and the internal antenna 12 implanted in the computer 8, is less than the distance between the sensor 111 implanted in the right rear wheel and this same antenna. Similarly, for the external antenna 14, it is nearer the right rear wheel and hence the sensor 111, than the left rear wheel and hence the sensor 110. By thus activating the internal antenna 12, the external antenna 14 being inactivated, when the sensitivity of the receiver 6 is nominal or decreased, the sensor 110 mounted in the left rear wheel is received with a greater power than from the sensor 111 mounted in the right rear wheel. Conversely, with the external antenna 14 activated and the internal antenna 12 inactivated, the sensor 111 mounted in the rear right wheel is received with a greater power than the sensor 110 mounted in the left rear wheel. Thus we have in Table 1, A2<<A3 and B3<<B2. Similarly, in Table 2, C2<<C3 and D3<<D2. From this it can be concluded that the sensor 110 is mounted at the left rear whilst the sensor 111 is mounted at the right rear.

To confirm the information as to location of the sensors 100, 101, 110, 111 mounted on the wheels 4 of the vehicle 2, the process described above can be carried out several times successively. There can thus be carried out a statistical analysis of the obtained results. This permits freedom from uncertainty connected to the use of the technology of RF signal emission. This statistical analysis can be carried out for the location of the four sensors of else only for the location of the rear sensors which are farthest from the antennas and hence for which the uncertainty of measurement is the greatest.

The present invention is not limited to the processes described above by way of non-limiting example nor to the system described for practicing these processes. It also comprises all the modified embodiments within the scope of those skilled in the art within the range of those skilled in the art within the scope of the following claims.

Thus, to analyze the power of the received signals, instead of measuring the power of a received signal, one can also act on the sensitivity of the receiver. One can for example depart from the nominal sensitivity of this receiver. The signals emitted by the four sensors are thus received by the receiver. By progressively decreasing this sensitivity, instead of receiving the signals from the four sensors, there will no longer be obtained but the signals from the three sensors, then from two and then from a single one. We can thus deduce that the first sensor whose signals are not received is the sensor farthest from the antenna in question, and that the sensor whose signal is received even though the sensitivity is very low, is the sensor nearest the antenna in question. There can thus be deduced the position of the four sensors.

The invention claimed is:

1. Process for location using locating sensors (100, 101, 110, 111) each mounted on a vehicle wheel (4), each sensor being provided with an emitter and the vehicle (2) being provided with a corresponding receiver (6) adapted to receive the signals emitted by each sensor (100, 101, 110, 111), characterized in that the receiver (6) is provided with two separate antennas (12, 14), separated from each other and disposed such that neither antenna is located substantially equidistantly from the sensors (100, 101, 110, 111), the two antennas (12, 14) being located on the same side of the vehicle, and in that the location of the sensors (100, 101, 110, 111) is carried out by analyzing the field power received by the receiver (6) by means of each antenna (12, 14) for each sensor, the power of the field received by one antenna being the greater, the nearer to the antenna is the sensor that emitted the corresponding signal, for a vehicle having four wheels (4), characterized in that the process comprises the following steps:

a) analysis of the power of the signals received by the two antennas (12, 14) so as to distinguish the two sensors (100, 101) located on the side of the antennas from the other two sensors (110, 111), the signals received from these two sensors being the less attenuated, b) one antenna being inactivated and the other being activated, analysis of the power of the signals received by the two sensors (100, 101) located on the same side as the antennas so as to determine which sensor is the nearer the antenna that is still activated, c) one antenna being inactivated and the other being activated, analysis of the power of the signals received from the two sensors (110, 111) located on the side opposite the antennas (12, 14) so as to determine which sensor is nearer to the antenna that is still activated.

2. Process for location according to claim 1, characterized in that step a) is carried out as follows:

adjustment of the receiver (6) to a predetermined sensitivity to receive all the signals emitted by the four sensors (100, 101, 110, 111) with the two antennas (12, 14), and adjustment of the receiver (6) to a lesser sensitivity such that, for the two antennas (12, 14), the signals emitted by the sensors (100, 101) located on the same side as the antennas will be received whilst the signals emitted by the other sensors (110, 111) are not received.

3. Process for location according to claim 1, characterized in that in step b) and/or step c), the power analysis is carried out by adjusting the sensitivity of the receiver (6) such that the signal power received by the sensor to be identified and located near the inactive antenna will be weak, whilst the power of the signal received by the sensor to be identified and located near the active antenna will be substantially stronger, and in that the analysis of the power levels received is made so as to detect the position of the two sensors whose signals are analyzed.

4. Process for location according to claim 1, characterized in that in step b) and/or step c), the power analysis is carried out by decreasing the sensitivity of the receiver (6) until a single signal emitted by the sensors to be identified will still be received by the receiver (6), and in that a determination of the position of the two sensors to be identified is thus carried out.

5. Process for location according to claim 1, characterized in that step b) and/or c) is carried out twice in succession, once with the first antenna active and the second antenna inactive and the second time with the first antenna inactive and the second antenna active, and in that a step of correlation is provided to compare the results obtained in the course of these two analyses.

6. Process for location according to claim 1, characterized in that step c) is carried out several times in a repetitive manner and in that a statistical analysis of the results is carried out.

7. Device for location to practice a process according to claim 1, characterized in that it comprises a receiver (6), two antennas (12, 14), a switch with two inputs insulated from each other and one output, mounted such that the receiver (6) is connected to one or the other of the antennas, as well as a computer (8) for the control and management of the device.

8. Device for location according to claim 7, characterized in that the receiver (6) is integrated into the computer (8).

9. Device for location according to claim 7, characterized in that one antenna (12) is integrated into the computer (8) and in that the other antenna (14) is an external antenna.

* * * * *